United States Patent
Matsumura (10) Patent No.: US 9,394,962 B2
(45) Date of Patent: Jul. 19, 2016

(54) DUST COVER

(71) Applicant: SUMITOMO RIKO COMPANY LIMITED, Komaki-shi, Aichi (JP)

(72) Inventor: Hiroyuki Matsumura, Komaki (JP)

(73) Assignee: SUMITOMO RIKO COMPANY LIMITED, Komaki-shi, Aichi (JP)

( * ) Notice: Subject to any disclaimer, the term of this patent is extended or adjusted under 35 U.S.C. 154(b) by 0 days.

(21) Appl. No.: 14/541,719

(22) Filed: Nov. 14, 2014

(65) Prior Publication Data

US 2015/0068855 A1    Mar. 12, 2015

Related U.S. Application Data

(63) Continuation of application No. PCT/JP2014/062590, filed on May 12, 2014.

(30) Foreign Application Priority Data

Sep. 12, 2013   (JP) ................................ 2013-189060

(51) Int. Cl.
   *F16J 15/52* (2006.01)
   *F16F 9/38* (2006.01)

(52) U.S. Cl.
   CPC ....................... *F16F 9/38* (2013.01)

(58) Field of Classification Search
   CPC ...... F16F 9/38; B29C 49/04; B29L 2002/025; B29L 2031/755; F16J 15/52; F16J 3/041; F16J 3/043; B60G 15/06
   USPC .......... 277/345, 636; 267/139, 140, 153, 220; 464/175
   See application file for complete search history.

(56) References Cited

U.S. PATENT DOCUMENTS

| 5,192,057 A * | 3/1993 | Wydra ............... B29D 22/0203 267/122 |
| 7,235,018 B2 * | 6/2007 | Deisinger ............... F16J 3/041 464/175 |
| 8,657,270 B2 | 2/2014 | Takada et al. |
| 8,657,271 B2 * | 2/2014 | Szekely ............... F16F 1/3732 267/140 |
| 2005/0020366 A1 * | 1/2005 | Scholtz ............... F16J 3/041 464/175 |
| 2008/0272529 A1 * | 11/2008 | Chervin ............... F16F 1/3732 267/201 |
| 2009/0243232 A1 * | 10/2009 | Deisinger ............... F16J 3/043 277/636 |

(Continued)

FOREIGN PATENT DOCUMENTS

| CN | 102076989 A | 5/2011 |
| CN | 103210233 A | 7/2013 |

(Continued)

OTHER PUBLICATIONS

Jun. 3, 2014 International Search Report issued in International Application No. PCT/JP2014/062590.

(Continued)

*Primary Examiner* — Christopher Schwartz
(74) *Attorney, Agent, or Firm* — Oliff PLC (57) ABSTRACT

A dust cover comprising a bellows tube portion with a plurality of main valleys being of a concave shape opening towards an outer periphery of the tube portion and arranged in a linked manner. Each of the main valleys includes a pair of slope wall portions that slope to opposite axial outsides while going to an outer peripheral side, and the slope wall portion has a slope angle at its outer peripheral portion smaller than a slope angle at its inner peripheral portion.

10 Claims, 5 Drawing Sheets

(56) References Cited

U.S. PATENT DOCUMENTS

| | | | |
|---|---|---|---|
| 2010/0160053 A1* | 6/2010 | Okubo | F16D 3/845 464/175 |
| 2011/0156327 A1 | 6/2011 | Nobusue et al. | |
| 2012/0319338 A1* | 12/2012 | Takada | F16F 9/38 267/217 |
| 2014/0035232 A1* | 2/2014 | Matsumura | F16F 9/38 277/345 |
| 2014/0284859 A1 | 9/2014 | Nobusue et al. | |
| 2015/0091257 A1* | 4/2015 | Matsumura | B29C 49/48 277/636 |

FOREIGN PATENT DOCUMENTS

| | | |
|---|---|---|
| JP | 2003004084 A | 1/2003 |
| WO | 2009157567 A1 | 12/2009 |
| WO | 2013072958 A1 | 5/2013 |

OTHER PUBLICATIONS

Mar. 24, 2016 International Preliminary Report on Patentability issued in International Application No. PCT/JP2014/062590.

Apr. 22, 2016 Office Action issued in Chinese Patent Application No. 201480020558.4.

* cited by examiner

DUST COVER

INCORPORATED BY REFERENCE

The disclosure of Japanese Patent Application No. 2013-189060 filed on Sep. 12, 2013 including the specification, drawings and abstract is incorporated herein by reference in its entirety. This is a Continuation of International Application No. PCT/JP2014/062590 filed on May 12, 2014.

BACKGROUND OF THE INVENTION

1. Field of the Invention

The present invention relates generally to a dust cover adapted to cover a piston rod etc. of a shock absorber which constitutes an automotive suspension mechanism and to prevent adhesion of grit, water or the like, for example.

2. Description of the Related Art

Conventionally, there is known a dust cover which prevents adhesion of grit, water or other foreign matters, and for example, by being externally fitted around a shock absorber and covering the periphery of the projecting part of a piston rod, the dust cover is used for preventing adhesion of the foreign matters to the piston rod or the like. The dust cover overall has a thin-walled tubular shape formed of a rubber elastic body, synthetic resin or the like, and is capable of extension/contraction in the axial direction according to the projecting amount of the piston rod from the cylinder by including a bellows tube portion having a plurality of main valleys of concave shape opening towards the outer periphery of the tube portion and arranged in a linked manner. Such a dust cover is disclosed in U.S. Pat. No. 8,657,270, for example.

Meanwhile, it is desirable that the axial minimum dimension of the dust cover during contraction be small so as to follow a large contraction of the shock absorber due to input from the road face. In order to make the minimum dimension of the dust cover small, it is conceivable to reduce the number of the main valleys that constitute the bellows tube portion so that the length during contraction is set small. Besides, the dust cover is required to have an initial length that is able to duly cover the entire projecting part of the piston rod in an installed state. Thus, in order to reduce the number of the main valleys while obtaining a sufficient length of the bellows tube portion, it is necessary to enlarge the slope angle of the slope wall portion of each main valley so as to ensure a large axial width of each main valley.

However, if the slope angle of the slope wall portion of the main valleys is enlarged, when the bellows tube portion is subjected to the axial force and undergoes contraction, compressive component applied to the slope wall portion is larger relative to shear component. Accordingly, the slope wall portion is likely to buckle, posing a risk of inhibiting smooth contraction of the bellows tube portion.

SUMMARY OF THE INVENTION

The present invention has been developed in view of the above-described matters as the background, and it is an object of the present invention to provide a dust cover with a novel structure which is able to reduce the number of the main valleys so as to decrease the length of the bellows tube portion during contraction as well as to realize smooth contraction deformation thereof.

The above and/or optional objects of this invention may be attained according to at least one of the following modes of the invention. The following modes and/or elements employed in each mode of the invention may be adopted at any possible optional combinations.

A first mode of the present invention provides a dust cover comprising a bellows tube portion having a plurality of main valleys being of a concave shape opening towards an outer periphery of the tube portion and arranged in a linked manner, wherein each of the main valleys includes a pair of slope wall portions that slope to opposite axial outsides while going to an outer peripheral side, and the slope wall portion has a slope angle at its outer peripheral portion smaller than that at its inner peripheral portion.

The dust cover constructed according to the first mode of the present invention is able to obtain a sufficient length in its initial shape before contraction, as well as to efficiently decrease its minimum length after contraction. The reason is that since the slope wall portion has a large slope angle at the inner peripheral portion of the slope wall portion, a sufficient initial length of the bellows tube portion is ensured with a small number of main valleys, making it possible to decrease its minimum length after contraction.

Moreover, the bellows tube portion is able to contract smoothly without any sticking or noises. Specifically, at the beginning of the contraction of the bellows tube portion, the outer peripheral portions of the slope wall portions having a smaller slope angle deform preferentially to the inner peripheral portions and overlap with one another in the axial direction, thereby imparting a high deformation rigidity to the outer peripheral portion of the slope wall portion. As a result, when the amount of contraction of the bellows tube portion increases and the inner peripheral portions deform, the substantial free length of the slope wall portion is small. Thus, buckling of the slope wall portion due to the compressive component is less likely to occur, whereby the contraction can be realized without being hampered by any strain deformation. In addition, at the beginning of the contraction of the bellows tube portion, while the outer peripheral portion primarily deforms, the inner peripheral portion also deforms and its slope angle decreases. Thus, at the stage where the outer peripheral portion completes deformation and the inner peripheral portion predominates in deformation, the compressive component exerted on the inner peripheral portion becomes smaller. The slope wall portion is able to stably deform thereby, realizing smooth contraction of the bellows tube portion.

A second mode of the present invention provides the dust cover according to the first mode wherein an auxiliary valley that has a concave shape shallower than the main valley is provided between the two main valleys axially adjacent to each other.

According to the second mode, owing to the auxiliary valley, the bellows tube portion is able to obtain a large amount of stroke in the axial direction. In particular, since the auxiliary valley is shallower than the main valley, the inner peripheral edge of the main valley and the inner peripheral edge of the auxiliary valley are deviated from each other in the radial direction, so as to be prevented from being overlapped with each other in the axial direction. Therefore, the minimum length of the bellows tube portion during contraction can be set small.

Furthermore, at the beginning of the contraction of the bellows tube portion, deformation of the auxiliary valley will take place together with deformation of the outer peripheral portion of the slope wall portion. Consequently, the deformation rigidity of the outer peripheral portion of the bellows tube portion will be more efficiently enhanced, thereby advantageously realizing a stable contraction of the bellows tube portion.

A third mode of the present invention provides the dust cover according to the first or second mode wherein the bellows tube portion becomes progressively thinner towards the outer peripheral side.

According to the third mode, deformation of the bellows tube portion will be more likely to occur at its outer peripheral portion preferentially to at its inner peripheral portion, so that the bellows tube portion is able to stably achieve smooth contraction.

A fourth mode of the present invention provides the dust cover according to any one of the first through third modes wherein at least one of the pair of slope wall portions has an abutting projection that projects towards another of the pair of slope wall portions.

According to the fourth mode, in the contraction state of the bellows tube portion, by the abutting projection coming into abutment against the other slope wall portion, it is possible to prevent formation of a hermetic space between the pair of the slope wall portions. Thus, noises due to the negative pressure within the hermetic space can be avoided when the bellows tube portion extends from the contraction state.

In particular, with the structure according to the present invention in which the slope angle at the inner peripheral portion of the slope wall portion is made larger than that at the outer peripheral portion thereof, a gap tends to be formed between the medial sections of the pair of slope wall portions. This gap poses a risk of causing noises by being sealed off from the outside. In light of that, by providing the abutting projection between the pair of slope wall portions, the gap will communicate with the outside, so that noises caused by the pressure drop within the gap during extension can be prevented.

A fifth mode of the present invention provides the dust cover according to any one of the first through fourth modes wherein the slope angle at the inner peripheral portion of the slope wall portion is from 35° to 55°.

According to the fifth mode, by setting the slope angle at the inner peripheral portion of the slope wall portion to 35° or greater, the axial width dimension of the main valley is duly made large, so that the bellows tube portion is able to obtain a sufficient length with a small number of main valleys. Meanwhile, by setting the slope angle at the inner peripheral portion of the slope wall portion to 55° or smaller, during contraction of the bellows tube portion, compressive component exerted on the inner peripheral portion of the slope wall portion is prevented from becoming excessively large. This will avoid buckling of the slope wall portion, thereby realizing smooth contraction of the bellows tube portion.

A sixth mode of the present invention provides the dust cover according to any one of the first through fifth modes wherein a differential between the slope angle at the outer peripheral portion and that at the inner peripheral portion of the slope wall portion is from 5° to 30°.

According to the sixth mode, by setting the differential between the slope angles at the outer peripheral portion and the inner peripheral portion of the slope wall portion to 5° or greater, the axial width dimension of the main valley can be largely obtained owing to the inner peripheral portion while realizing smooth contraction deformation owing to the preferential deformation of the outer peripheral portion. Meanwhile, by setting the differential between the slope angles at the outer peripheral portion and the inner peripheral portion of the slope wall portion to 30° or smaller, the axial width dimension of the main valley can be sufficiently obtained even at the outer peripheral portion, while capable of preventing the compressive component exerted on the inner peripheral portion from becoming excessively greater than the shear component.

According to the present invention, each of the slope wall portions of the main valley has a slope angle at its outer peripheral portion smaller than that at its inner peripheral portion. Thus, during contraction of the bellows tube portion, the outer peripheral portions having a smaller slope angle preferentially deform and overlap with one another in the axial direction, thereby imparting a high deformation rigidity to the outer peripheral portion of the bellows tube portion. By so doing, when the amount of contraction of the bellows tube portion increases and the inner peripheral portions deform, the substantial free length of the slope wall portion is small. Thus, buckling of the slope wall portion is inhibited, realizing smooth contraction of the bellows tube portion. In addition, at the stage where the amount of contraction of the bellows tube portion is small, not only the outer peripheral portion but also the inner peripheral portion undergoes deformation. Therefore, at the stage where the amount of contraction of the bellows tube portion increases and the inner peripheral portion predominates in deformation, the compressive component exerted on the inner peripheral portion will be reduced relative to the shear component, so that the bellows tube portion contracts smoothly without buckling.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention will be described below in reference to the drawings.

Figure 1:
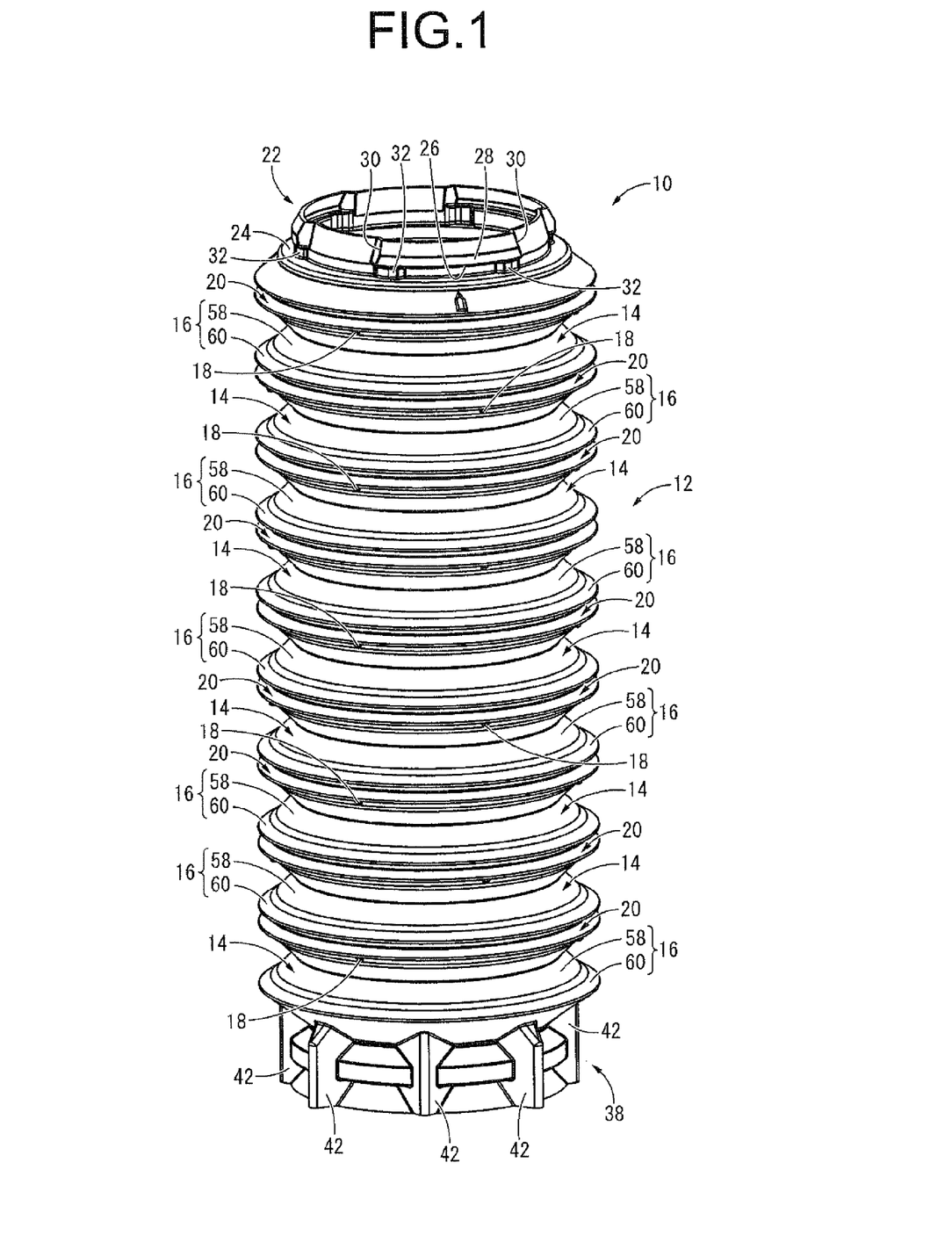
FIG. 1 is a perspective view showing a dust cover as a first embodiment of the present invention.
Figure 2:
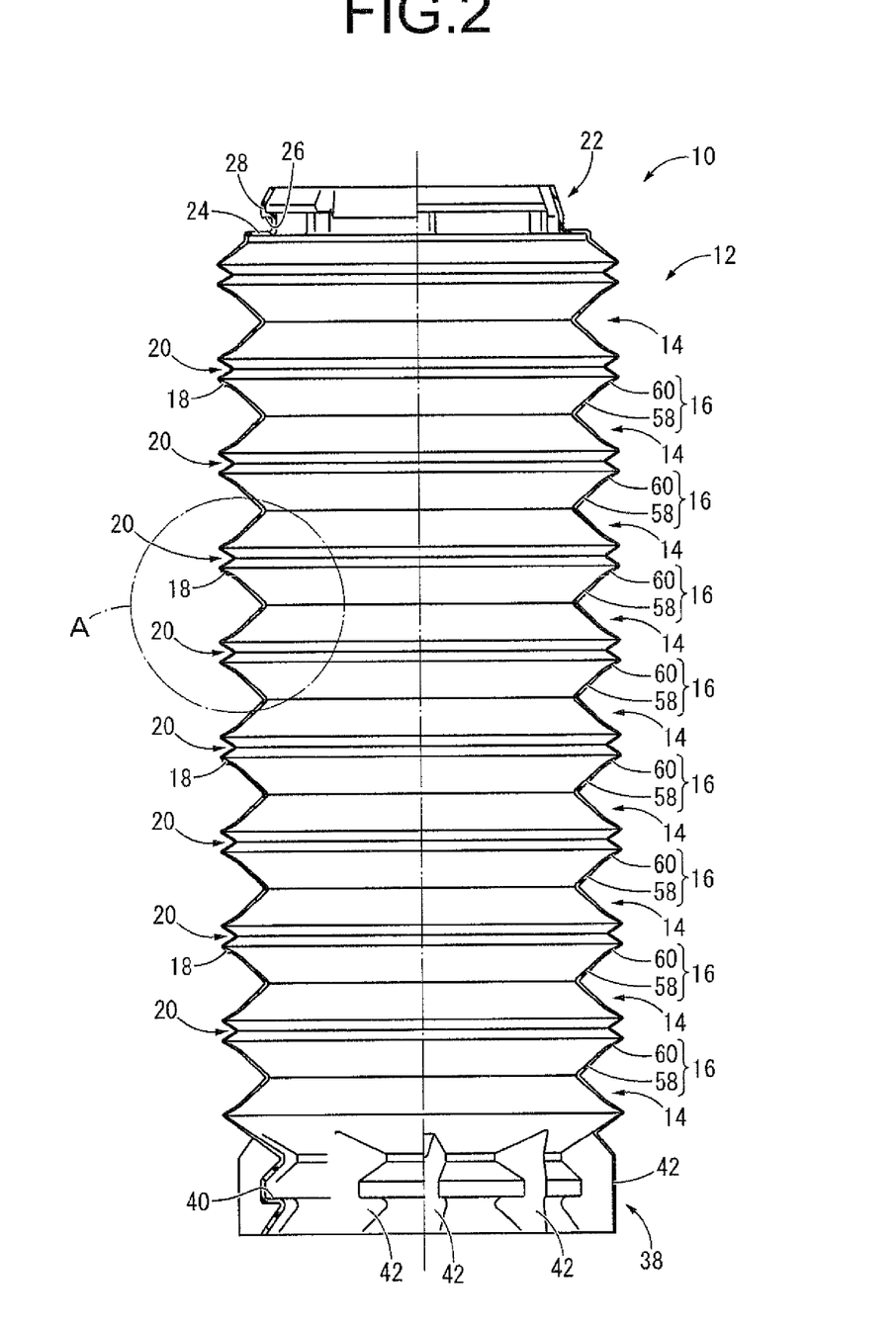
FIG. 2 is a longitudinal cross sectional view of the dust cover shown in FIG. 1, whose left half indicates a longitudinal cross section at a position away from an insertion groove and a bent portion in the circumferential direction, while its right half indicates a longitudinal cross section at the circumferential center of the insertion groove and at the apex of the bent portion.

A dust cover 10 according to a first embodiment of the present invention is depicted in FIGS. 1 and 2. The dust cover 10 overall has a thin-walled tubular shape, and is formed of synthetic resin, a rubber elastic body, or the like. In the present embodiment, the dust cover 10 is formed of synthetic resin, and while no particular limitation is imposed as to its constituent material, for example, a material made from polypropylene (PP) serving as a thermoplastic resin mixed with ethylene-propylene rubber (EPDM) and dispersed is preferably employed, because of its excellent weatherability, formability or the like. However, in case of forming the dust cover 10 using a thermoplastic resin, it could also be possible to employ, for example, various thermoplastic elastomers including polyolefin-based resins such as polypropylene, polyethylene or the like, polyamide-based resins, polyvinyl chloride-based resins, polyester-based resins, urethane-based resins, styrene-based resins, olefin-based resins, or the like. Besides, while blow molding is preferably employed as a molding method of the dust cover 10, injection molding is also employable.

The dust cover 10 includes a bellows tube portion 12 in its axial medial section. The bellows tube portion 12 has a structure in which a plurality of main valleys 14 are arranged in a linked manner vertically in the axial direction. Each main valley 14 has a concave shape that opens towards the outer periphery and continues around the entire circumference with a generally V-shaped cross section rotated laterally. Also, each main valley 14 includes a pair of slope wall portions 16, 16 that slope to opposite axial outsides while going to the outer peripheral side so as to form tapered contours. In addition, the bellows tube portion 12 becomes progressively thinner towards the outer peripheral side. In the present embodiment, the thickness differential is established by blow molding of the dust cover 10.

Figure 3:
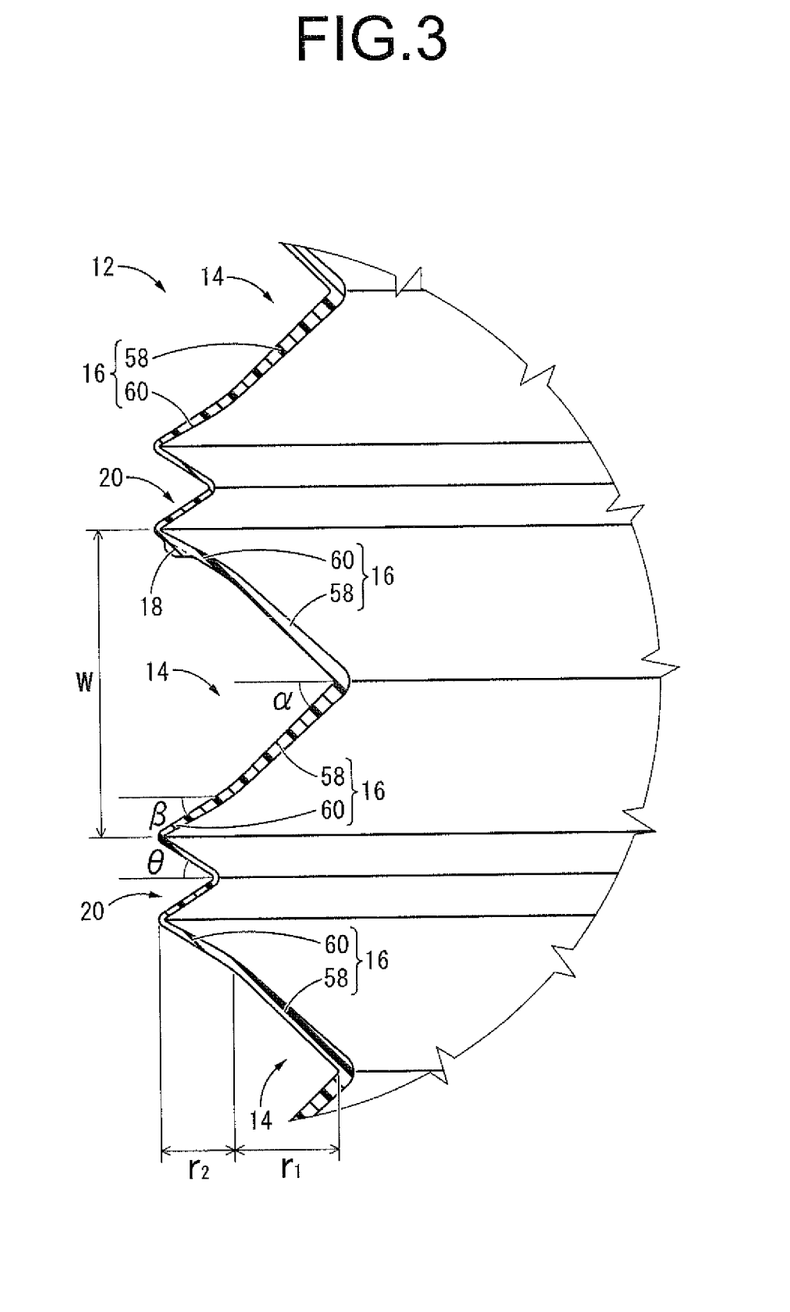
FIG. 3 is a fragmentary enlarged view of a principle part of the dust cover shown in FIG. 1, where A of FIG. 2 is enlarged.

Moreover, as depicted in FIG. 3, the slope wall portion 16 has an abutting projection 18. The abutting projection 18 is an approximately semispheroidal projection with a major axis that extends along the direction of slope of the slope wall portion 16, and projects from one of the pair of slope wall portions 16, 16 towards the other. In the present embodiment, four abutting projections 18, 18, 18, 18 are dispersedly arranged at regular intervals along the circumference on the upper slope wall portion 16. Furthermore, with the main valleys 14, 14 axially adjacent to each other, the positions of the abutting projections 18 relatively deviate by 45° in the circumferential direction. While it is desirable that the shape of the abutting projection 18 be elongated along the direction of slope of the slope wall portion 16, the shape is not limited in particular. For example, a projection of semispherical shape or rectangular parallelepiped shape can also be employed.

Additionally, there are formed auxiliary valleys 20 each arranged between the main valleys 14, 14 axially adjacent to each other, while opening to the outer peripheral side. Each auxiliary valley 20 is formed at the outer peripheral portion of the bellows tube portion 12 and has a concave shape that opens towards the outer periphery while continuing around the entire circumference with a generally V-shaped cross section rotated laterally. Besides, the auxiliary valley 20 is narrower as well as shallower than the main valley 14.

The bellows tube portion 12 is capable of extension/contraction in the axial direction due to change in angles at the outer peripheral edge and the inner peripheral edge of the main valley 14. Moreover, in the present embodiment, due to change in angle at the inner peripheral edge of the auxiliary valley 20, the range of extension/contraction length allowed in the axial direction is enlarged. In addition, the main valley 14 and the auxiliary valley 20 are formed with mutually different depths so that the respective inner peripheral edges are deviated from each other in the radial direction. Thus, the inner peripheral edges of the main valley 14 and the auxiliary valley 20 are prevented from being overlapped with each other in the axial direction, realizing a small axial dimension of the bellows tube portion 12 in the maximum contraction state.

Meanwhile, the dust cover 10 includes an engaging tube portion 22 at axially above the bellows tube portion 12. The engaging tube portion 22 is of approximately cylindrical shape overall and has a flange portion 24 integrally formed with its lower end portion while projecting peripherally outward, which is linked to the upper edge of the bellows tube portion 12.

The engaging tube portion 22 further includes an engaging groove 26. The engaging groove 26 is a recessed groove that opens onto the outer peripheral surface and extends about the entire circumference. The axially upper wall portion of the engaging groove 26 is defined by an upper wall portion 28 that projects peripherally outward from the upper end portion of the engaging tube portion 22, while its axially lower wall portion is defined by the flange portion 24.

Moreover, a plurality of insertion grooves 30 are formed so as to communicate with the engaging groove 26. The insertion grooves 30 open onto the outer peripheral surface of the engaging tube portion 22 and extend in the axial direction so that each lower end of the insertion grooves 30 communicates with the engaging groove 26.

In addition, surmountable projections 32 are formed within the engaging groove 26. The surmountable projections 32 project peripherally outward from the bottom face of the engaging groove 26 at its both circumferential ends, and extend vertically between the upper wall portion 28 and the flange portion 24. Due to these surmountable projections 32, the both circumferential ends of the engaging groove 26 are partially made shallow but are not blocked thereby, opening in the circumferential direction.

Figure 4:
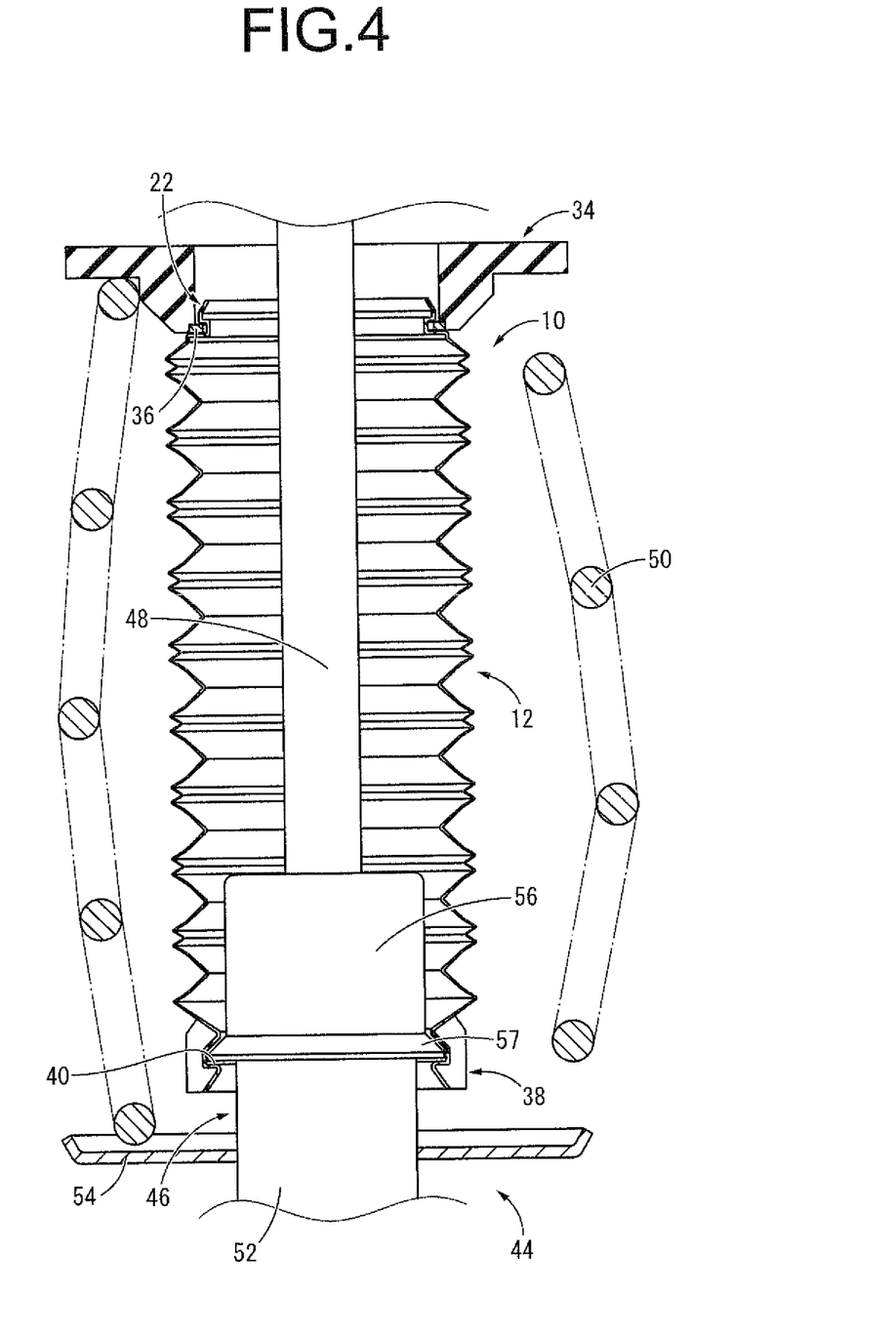
FIG. 4 is a view showing the dust cover of FIG. 1 in the installed state to a vehicle.

As depicted in FIG. 4, the engaging tube portion 22 is configured to be attached to an upper insulator 34. The upper insulator 34 is an annular rubber elastic body with a rigid annular restraining member 36 secured to its lower end portion. The annular restraining member 36 includes three projecting parts on its circumference which project peripherally inward from the locations corresponding to the insertion grooves 30. The shape of the projecting parts viewed in the axial direction and the thickness dimension thereof are established so as to be insertable into the engaging groove 26. Also, the shape of the projecting parts viewed in the axial direction and the circumferential dimension thereof are established so as to be insertable into the insertion groove 30. Note that the annular restraining member 36 may be integrally provided during molding of the upper insulator 34 by being inserted or attached later, or alternatively, it may be integrally provided in advance by, for example, a two-color molding process or the like.

The dust cover 10 is attached to the upper insulator 34 constructed in the above manner. Specifically, first, with the projecting parts of the annular restraining member 36 of the upper insulator 34 circumferentially positioned with respect to the insertion grooves 30 of the dust cover 10, the engaging tube portion 22 of the dust cover 10 is inserted into the upper insulator 34. Then, the dust cover 10 is rotated in the circumferential direction relative to the upper insulator 34 so that the projecting parts of the annular restraining member 36 are inserted from the insertion grooves 30 into the engaging grooves 26, whereby the annular restraining member 36 is detained against the engaging groove 26 in the axial direction. By so doing, as depicted in FIG. 4, the upper end portion of the dust cover 10 is attached to the inner peripheral side of the upper insulator 34 and supported thereby.

Meanwhile, the dust cover 10 includes a mating tube portion 38 below the bellows tube portion 12. The mating tube portion 38 is of approximately cylindrical shape and has a circumferential groove 40 at its axially medial section that opens onto the inner peripheral surface. In addition, the mating tube portion 38 includes a plurality of bent portions 42 on the circumference. The bent portion 42 has a mountain-shaped cross section that projects peripherally outward while opening peripherally inward, and extends nearly straightly in the axial direction.

The dust cover 10 and the upper insulator 34 are attached to an automotive suspension mechanism 44 as shown in FIG. 4, for example. Specifically, the bellows tube portion 12 of the dust cover 10 is externally fitted around a piston rod 48 of a shock absorber 46 that constitutes the suspension mechanism 44, while the upper insulator 34 is overlapped with a spring seat fitting (not shown) adapted to attach to the piston rod 48. Besides, the upper end portion of a coil spring 50 is supported by the upper insulator 34, and the upper insulator 34 is pressed against the spring seat fitting by elasticity of the coil spring 50. Meanwhile, the lower end portion of the coil spring 50 is supported by a spring support fitting 54 fixed to a cylinder 52 of the shock absorber 46.

Then, a catch claw 57, which is provided to a cylinder cap 56 attached to the upper end portion of the cylinder 52, is inserted from the opening of the mating tube portion 38 of the dust cover 10 into the circumferential groove 40 formed in the mating tube portion 38. By so doing, the dust cover 10 is arranged such that its upper end portion is attached to the piston rod 48 via the upper insulator 34, while its lower end portion is attached to the cylinder 52.

With the dust cover 10 installed to the suspension mechanism 44 in this way, when the shock absorber 46 contracts, the bellows tube portion 12 of the dust cover 10 follows to contract in the axial direction. On the other hand, when the shock absorber 46 extends, the bellows tube portion 12 of the dust cover 10 follows to extend in the axial direction. Accordingly, the projecting part of the piston rod 48 out of the cylinder 52 is always kept covered by the dust cover 10.

According to the dust cover 10 of the present embodiment, the number of main valleys 14 is reduced so that the minimum dimension of the bellows tube portion 12 during contraction is made small. In addition, a large angle of each main valley 14 is ensured so as to obtain a sufficient natural length of the bellows tube portion 12.

Here, as depicted in FIG. 3, the slope wall portion 16 of the main valley 14 has a slope angle: $\beta$ at its outer peripheral portion 60 smaller than a slope angle: $\alpha$ at its inner peripheral portion 58 ($\alpha > \beta$). In the present embodiment, the inner peripheral portion 58 and the outer peripheral portion 60 each has a linear shape in the axial cross section, and these inner peripheral portion 58 and outer peripheral portion 60 are connected so as to make a bend at the boundary when viewed in longitudinal cross section. Note that the slope angle mentioned herein is a slope angle with respect to a plane that extends in the axis-perpendicular direction, as apparent from FIG. 3. That is, the inner peripheral portion 58 and the outer peripheral portion 60 both have a tapered cylindrical shape with generally unchanging taper angle, and the taper angle with respect to the central axis is made larger at the outer peripheral portion 60 ($90° - \beta$) rather than at the inner peripheral portion 58 ($90° - \alpha$).

With the bellows tube portion 12 having the slope wall portion 16 of this construction, a sufficient axial dimension is obtained before contraction by a small number of the main valleys 14, while its minimum dimension during contraction is made small. Besides, smooth contraction of the bellows tube portion 12 will be realized.

Figure 5A:
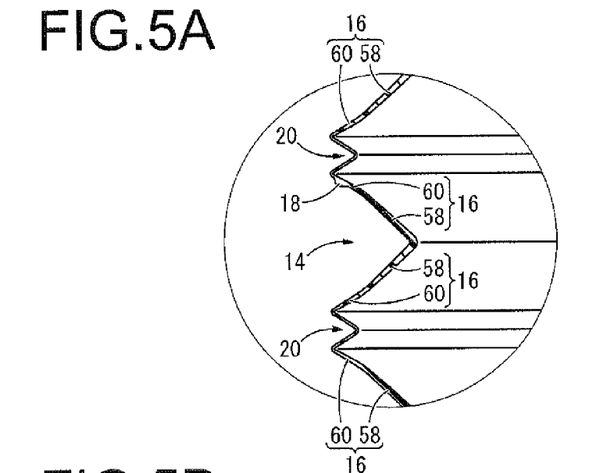
FIGS. 5A-5C are enlarged cross sectional views of a principle part of a bellows tube portion of the dust cover shown in FIG. 1, wherein FIG. 5A indicates an initial state, FIG. 5B indicates a state where the bellows tube portion undergoes a slight contraction, and FIG. 5C indicates a state where the bellows tube portion undergoes an appreciable contraction.

Specifically, as depicted in FIG. 5A, with regard to the bellows tube portion 12 before contraction, since the slope wall portion 16 of each main valley 14 includes the inner peripheral portion 58 having a large slope angle, the width dimension: w of each main valley 14 in the axial direction is made large (see FIG. 3). With this arrangement, a large axial dimension of the bellows tube portion 12 is ensured by the small number of the main valleys 14.

Figure 5B:
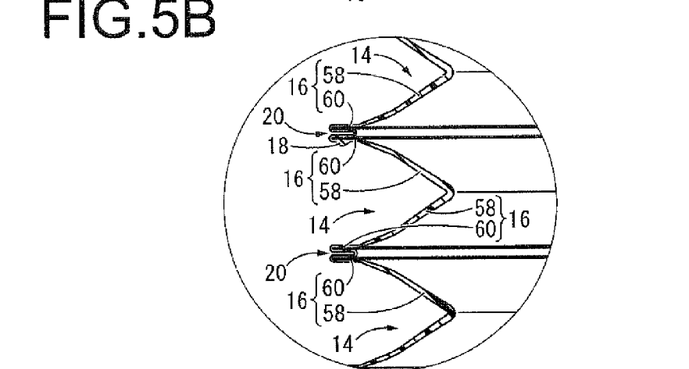

When the bellows tube portion 12 is subjected to the axial compression force and undergoes a slight contraction, as depicted in FIG. 5B, with each auxiliary valley 20, the angles at the inner peripheral edge and at the outer peripheral edge change so that the outer peripheral portion 60 of the main valley 14 that has a small slope angle and the auxiliary valley 20 deform. Meanwhile, with regard to the inner peripheral portion 58 of the main valley 14 that has a large slope angle, if the amount of contraction of the bellows tube portion 12 is small, the amount of deformation is smaller than that of the outer peripheral portion 60 so that its initial shape is almost retained.

Figure 5C:
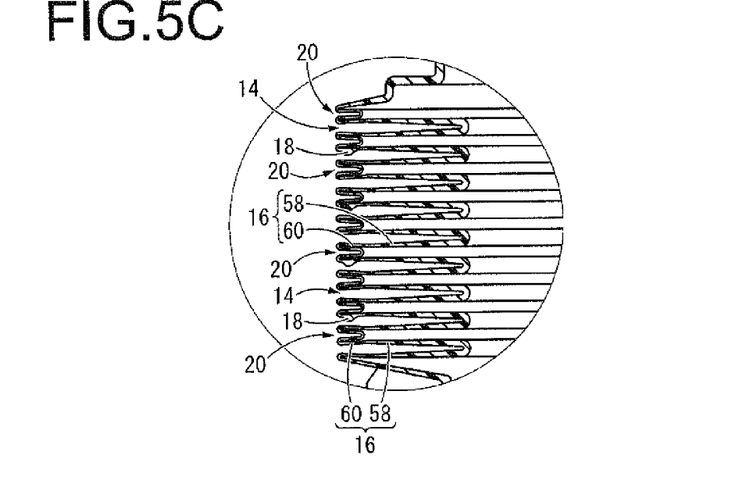

When the bellows tube portion 12 is subjected to a large compression force in the axial direction and undergoes an appreciable contraction, at the beginning of the contraction, the outer peripheral portion 60 of the main valley 14 that has a small slope angle and the auxiliary valley 20 firstly deform, as depicted in FIG. 5B. Subsequently, as depicted in FIG. 5C, the inner peripheral portion 58 of the main valley 14 that has a large slope angle deform, so that the bellows tube portion 12 undergoes a significant contraction in the axial direction.

In this way, during contraction of the bellows tube portion 12, the outer peripheral portion 60 of the main valley 14 and the auxiliary valley 20 preferentially deform and the outer peripheral sections of the bellows tube portion 12 (the outer peripheral portion 60 of the slope wall portion 16 and the auxiliary valley 20) overlap with one another in the axial direction, thereby imparting a high deformation rigidity to the outer peripheral sections of the bellows tube portion 12 including the outer peripheral portion 60 of the slope wall portion 16. By so doing, when the inner peripheral sections of the bellows tube portion 12 deform, the substantial free length of the slope wall portion 16 is small and buckling of the slope wall portion 16 with respect to the compressive component is prevented. Thus, each main valley 14 is folded in a regular shape, realizing smooth contraction of the bellows tube portion 12.

Moreover, at the beginning of the contraction of the bellows tube portion 12, the outer peripheral sections 60, 20 of the bellows tube portion 12 mainly deforms, but the inner peripheral portion 58 also deforms so as to have a smaller slope angle than that before its contraction (see FIG. 5B). Accordingly, the compressive component exerted on the slope wall portion 16 becomes smaller, and buckling of the slope wall portion 16 is prevented. Thus, smooth contraction of the bellows tube portion 12 is realized.

In order to advantageously obtain the above-described effect, it is desirable that the slope angle: $\alpha$ at the inner peripheral portion 58 be $35° \leq \alpha \leq 55°$, and more desirably be $40° \leq \alpha \leq 50°$. This makes it possible to ensure a large width dimension of the main valley 14 in the axial direction, whereby a sufficient length of the bellows tube portion 12 can be obtained by the small number of the main valleys 14. In addition, the compressive component exerted on the inner peripheral portion 58 is prevented from becoming excessively greater than the shear component, realizing smooth contraction described later.

Additionally, it is preferable that the radial dimension: $r_2$ of the outer peripheral portion 60 with respect to the radial dimension: $r_1$ of the inner peripheral portion 58 be $r_1/3 \leq r_2 \leq r_1$, and more preferably be $r_1/2 \leq r_2 \leq r_1$. With this arrangement, the inner peripheral portion 58 having a large slope angle can be obtained in a large size, thereby ensuring a large width dimension of the main valley 14 in the axial direction. Besides, the outer peripheral portion 60 can be obtained in a sufficient size, thereby effectively realizing smooth contraction of the bellows tube portion 12 described later.

Furthermore, it is desirable that the differential ($\alpha-\beta$) between the slope angle: $\alpha$ at the inner peripheral portion 58 and the slope angle: $\beta$ at the outer peripheral portion 60 be $5°\leq\alpha-\beta\leq30°$, and more desirably be $10°\leq\alpha-\beta\leq20°$. This arrangement effectively makes it possible to obtain a sufficient width dimension of the main valley 14 in the axial direction by the inner peripheral portion 58 as well as to realize smooth contraction of the bellows tube portion 12 by the outer peripheral portion 60.

As described above, with regard to the slope wall portion 16, the slope angle: $\beta$ at the inner peripheral portion 58 is made smaller than the slope angle: $\alpha$ at the outer peripheral portion 60. Thus, in the state where the bellows tube portion 12 is contracted in the axial direction to the extent that the amount of contraction becomes maximum, the outer peripheral edges of the pair of slope wall portions 16, 16 come into contact with each other while the medial sections thereof separate from each other so as to form a gap therebetween. In this respect, owing to the abutting projection 18 provided on the outer peripheral edge of the slope wall portion 16, the outer peripheral edges of the pair of the slope wall portions 16, 16 are prevented from adhering to each other about the entire circumference, so that the gap formed between the medial sections of the pair of the slope wall portions 16, 16 communicates with the outside at least at both sides of the abutting projection 18 in the circumferential direction. Therefore, when the bellows tube portion 12 recovers from the contraction state, pressure drop in the gap will be avoided, thereby preventing occurrence of noises.

It is preferable that the slope angle ($\theta$) of opposite side walls that constitute the auxiliary valley 20 be set smaller than the slope angle ($\alpha$) of the main valley 14 at the inner peripheral portion 58 ($\theta<\alpha$), and more preferably be smaller than or equal to the slope angle ($\beta$) of the main valley 14 at the outer peripheral portion 60 ($\theta\leq\beta$). With this arrangement, the auxiliary valleys 20 can preferentially deform. Also, the thickness dimension of the auxiliary valley 20 will preferably be smaller than that of the inner peripheral portion 58.

An embodiment of the present invention has been described in detail above, but the present invention is not limited to those specific descriptions. For example, the number of the main valleys 14 or the auxiliary valleys 20 to be formed is not particularly limited, but may be desirably changed depending on the amount of contraction in the axial direction or the like required of the bellows tube portion 12.

In addition, whereas it is desirable to provide the auxiliary valleys 20 in order to obtain a large axial dimension of the bellows tube portion 12 and to more advantageously realize smooth contraction deformation thereof, the auxiliary valleys 20 may be dispensed with, and only the main valleys 14 may be continuously provided in plurality along the axial direction.

It would also be possible for example to provide a medial portion in the slope wall portion between the inner peripheral portion 58 and the outer peripheral portion 60 and to set the slope angle: $\gamma$ at the medial portion to be $\beta<\gamma<\alpha$, so that the slope wall portion will bend in multiple steps when viewed in longitudinal cross section. By so doing, when the bellows tube portion 12 contracts, the outer peripheral portion 60 deforms first, and the medial portion deforms next, then the inner peripheral portion 58 deforms last. This makes it possible to ensure a large axial width of the main valley as well as to effectively prevent buckling of the inner peripheral portion 58 during its deformation.

Besides, it would also be acceptable for the slope wall portion to have a longitudinal cross section that curves in its entirety so that the inner peripheral portion and the outer peripheral portion of the slope wall portion are provided in continuous fashion with a changing slope angle without any clear boundary therebetween. As will be apparent from this, when viewed in longitudinal cross section, the shape of each of the inner peripheral portion and the outer peripheral portion is not limited to a linear one but may alternatively be a partially or entirely curved one.

Also, in the preceding embodiment, the abutting projection 18 is provided only on the upper slope wall portion 16. However, the abutting projection 18 may be provided on both upper and lower slope wall portions 16, 16, or could instead be provided only on the lower slope wall portion 16. While it is preferable to provide the abutting projection 18 in order to prevent noises during contraction of the bellows tube portion 12, the abutting projection 18 is not essential but may be omitted.

Moreover, whereas the dust cover 10 adapted to be used for a suspension is illustrated in the preceding embodiment, the present invention can preferably be implemented in protective covers to be used for other automotive components. Furthermore, the application range of the present invention is not limited to automotive dust covers, but includes, for example, dust covers etc. for protecting joint parts of robot arms or the like.

What is claimed is:

1. A dust cover comprising
a bellows tube portion having a plurality of main valleys being of a concave shape opening towards an outer periphery of the bellows tube portion, the plurality of main valleys being arranged in a linked manner, wherein each of the main valleys includes a pair of slope wall portions that slope to opposite axial outsides while going to an outer peripheral side, and
each of the pair of slope wall portions has a slope angle at its outer peripheral portion that is smaller than the slope angle at its inner peripheral portion.

2. The dust cover according to claim 1, wherein an auxiliary valley that has a concave shape shallower than the main valley is provided between axially adjacent ones of the plurality of main valleys.

3. The dust cover according to claim 1, wherein the bellows tube portion becomes progressively thinner towards the outer peripheral side.

4. The dust cover according to claim 1, wherein at least one of the pair of slope wall portions has an abutting projection that projects towards another of the pair of slope wall portions.

5. The dust cover according to claim 4, wherein the abutting projection is provided on an outer peripheral edge of the at least one of the pair of slope wall portions.

6. The dust cover according to claim 1, wherein the slope angle at the inner peripheral portion of each of the pair of slope wall portions is between 35° and 55° inclusive.

7. The dust cover according to claim 1, wherein a differential between the slope angle at the outer peripheral portion and the slope angle at the inner peripheral portion of each of the pair of slope wall portions is between 5° and 30° inclusive.

8. The dust cover according to claim 1, wherein the inner peripheral portion and the outer peripheral portion of each of the pair of slope wall portions are connected so as to make a bend at a boundary, as viewed in an axial cross section.

9. The dust cover according to claim 1, wherein the inner peripheral portion and the outer peripheral portion of each of the pair of slope wall portions have a linear shape in an axial cross section with respective unchanging taper angles.

10. The dust cover according to claim 1, wherein a radial dimension $r_2$ of the outer peripheral portion with respect to a radial dimension $r_1$ of the inner peripheral portion is $r_1/3 \leq r_2 \leq r_1$.

* * * * *